United States Patent
Oh et al.

(10) Patent No.: US 10,950,885 B2
(45) Date of Patent: Mar. 16, 2021

(54) ALL-SOLID BATTERY AND METHOD OF MANUFACTURING THE SAME

(71) Applicants: Hyundai Motor Company, Seoul (KR); Kia Motors Corporation, Seoul (KR)

(72) Inventors: Pil Gun Oh, Seoul (KR); Yong Sub Yoon, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 518 days.

(21) Appl. No.: 15/842,024

(22) Filed: Dec. 14, 2017

(65) Prior Publication Data

US 2019/0013540 A1  Jan. 10, 2019

(30) Foreign Application Priority Data

Jul. 6, 2017 (KR) .......... 10-2017-0085882

(51) Int. Cl.
| | |
|---|---|
| H01M 10/052 | (2010.01) |
| H01M 4/1391 | (2010.01) |
| H01M 4/62 | (2006.01) |
| H01M 4/139 | (2010.01) |
| H01M 10/0585 | (2010.01) |
| H01M 10/0562 | (2010.01) |
| H01M 4/70 | (2006.01) |
| H01M 2/02 | (2006.01) |
| H01M 4/02 | (2006.01) |

(52) U.S. Cl.
CPC .......... *H01M 10/052* (2013.01); *H01M 4/139* (2013.01); *H01M 4/1391* (2013.01); *H01M 4/621* (2013.01); *H01M 4/70* (2013.01); *H01M 10/0562* (2013.01); *H01M 10/0585* (2013.01); *H01M 2/0207* (2013.01); *H01M 2004/028* (2013.01)

(58) Field of Classification Search
CPC .......... H01M 10/052; H01M 10/0562; H01M 10/0585; H01M 4/139; H01M 4/1391; H01M 4/621; H01M 4/70
See application file for complete search history.

(56) References Cited

U.S. PATENT DOCUMENTS

2016/0072125 A1* 3/2016 Kimura ............... H01M 4/483
429/131

FOREIGN PATENT DOCUMENTS

| JP | 2012104320 | * | 5/2012 |
|---|---|---|---|
| JP | 2015-069775 A | | 4/2015 |
| JP | 2015-069842 A | | 4/2015 |
| JP | 2015-076272 A | | 4/2015 |
| JP | 2015-125893 A | | 7/2015 |
| KR | 10-1062690 B1 | | 9/2011 |

* cited by examiner

*Primary Examiner* — Jayne L Mershon
(74) *Attorney, Agent, or Firm* — Mintz Levin Cohn Ferris Glovsky and Popeo, P.C.; Peter F. Corless

(57) ABSTRACT

Disclosed are an all-solid battery and a method of manufacturing the same. The all-solid battery as disclosed herein may include current collectors having the same size for a cathode and an anode, the elongation areas of the cathode and the anode may be controlled due to the ductility of the current collectors during a pressing process. Thus, areas of the anode and the cathode may become different from each other upon the pressing, thus preventing a short-circuit fault from being formed at the edge portion thereof in the pressing process.

6 Claims, 4 Drawing Sheets

ALL-SOLID BATTERY AND METHOD OF MANUFACTURING THE SAME

CROSS REFERENCE TO RELATED APPLICATION

The present application claims priority to Korean Patent Application no. 10-2017-0085882, filed Jul. 6, 2017, the entire contents of which is incorporated herein for all purposes by this reference.

TECHNICAL FIELD

The present invention relates to an all-solid battery and a method of manufacturing the same.

BACKGROUND OF THE INVENTION

A lithium secondary battery has been widely used, however, because the elongation percentage of the anode layer includes an electrolytic solution containing a combustible organic solvent, e serious problems related to safety may be caused in the event of external impacts or the like. Therefore, a battery cell may require to include an additional material for improving safety, in addition to the basic structure thereof, or be equipped with an additional safety unit. For instance, an all-solid battery has been made with a solid electrolyte that replacing the organic electrolytic solution, and has been considered as a next-generation battery to solve the above safety problem.

In the battery cell, lithium ions are moved from a cathode to an anode during charging, thereby generating electrochemical energy, and then the electrochemical energy can be used upon discharging. Preferably, the anode may have an area greater than that of the cathode in order for the anode to receive all lithium ions moved from the cathode.

FIG. 1 shows a stacking structure of a battery cell in which the area of the anode layer 20 is greater than the area of the cathode layer 10 in the related art. However, a typical process for fabricating an all-solid battery may require an enforced pressing procedure. As such, due to the difference in area between the cathode and the anode, as shown in FIG. 2, a strong stress may be applied to the anode edge portion, and thus the electrolyte layer 30 and the anode composite layer 22 may break, undesirably incurring a battery short-circuit phenomenon whereby the cathode and the anode of the cell may come into direct contact with each other after the pressing procedure.

In the related art, techniques for ensuring insulation performance of the edge portion of an all-solid battery have been introduced, for example, an insulator may be inserted into the electrode edge portion. However, short-circuiting of the edge portion may occur because the edge portion may be stripped when the battery is subjected to pressure during the battery fabrication process and thus the insulator itself may break.

In addition, in the related art, a pouch having tape has been used in the all-solid battery, such that the electrode edge portion may be attached to the tape to thus prevent a short-circuit fault from occurring. However, a short-circuit fault may remain because of the spacing between the pouch and the edge portion.

Moreover, the conventional techniques may be unsuitable for use in mass production due to complicated processing and high manufacturing costs, such that mass productivity may not be assured.

SUMMARY OF THE INVENTION

In preferred aspects, the present invention provides an all-solid battery, which may prevent a battery short-circuit fault from occurring as a result of breakage of an edge portion thereof.

In one preferred aspect, provided is an all-solid battery that may include: a cathode layer, an anode layer and an electrolyte layer, and the cathode layer and the anode layer are stacked and pressed to form the all-solid battery. In particular, an elongation of the cathode layer and an elongation of the anode layer may be different upon pressing the stacked cathode layer and anode layer, an area of the cathode layer and an area of the anode layer may be same when stacked, and upon the pressing, the area of the cathode layer and an area of the anode layer may be different. After the pressing, the area of the anode layer may be greater than the area of the cathode layer.

The term "different" as used herein is meant by having a difference between a first value and a second value (e.g., an area of an anode layer and an area of a cathode layer) by about 1% or more, about 2% or more, about 5% or more, about 10% or more, about 15%, about 20% or more, about 25% or more, about 30% or more, about 40% or more, or about 50% or more based on the first value or the second value. In embodiment, the first value is different from the second value by about 1% or more, about 2% or more, about 5% or more, about 10% or more, about 15% or more, about 20% or more, about 25% or more, about 30% or more, about 40% or more, or about 50% or more based on the first value. In embodiment, the second value is different from the first value by about 1% or more, about 2% or more, about 5% or more, about 10% or more, about 15% or more, about 20% or more, about 25% or more, about 30% or more, about 40% or more, or about 50% or more based on the second value. In certain embodiments, different values will not differ by more than about 80%, 100%, 200% or 300%.

The term "same" as used herein is meant by having a small difference between a first value and a second value (e.g., an area of an anode layer and an area of a cathode layer) by less than about 1%, less than about 0.5%, less than about 0.2%, or less than about 0.1% of the first value or the second value. In embodiment, the first value may be same with the second value wherein the difference therebetween may be less than about 1%, less than about 0.5%, less than about 0.2%, or less than about 0.1% of the first value. In embodiment, the second value may be same with the first value wherein the difference therebetween may be less than about 1%, less than about 0.5%, less than about 0.2%, or less than about 0.1% of the second value.

The term "elongation" as used herein refers to a property or character of a material that is defined by increase in one, two or three dimensional extent (e.g., length) of the material upon applying of external force. Likewise, the term "elongation percentage" as used herein refers to a numerical percentage indicating increase of one, two or three dimensional extent (e.g., length) of the material, which can be obtained or calculated with difference in the extent divided by the initial extent (e.g. length) before the force is applied.

The anode layer may include an anode current collector coated with an anode composite layer, and an elongation percentage of the cathode current collector and an elongation percentage of the anode current collector may be different.

In certain embodiments, the elongation percentage of the anode current collector may be greater than about 100% but less than about 150%, greater than about 100% but less than about 140%, greater than about 100% but less than about 130%, greater than about 100% but less than about 130%, or about 101% to 120% of the elongation percentage of the cathode current collector. The cathode composite layer may include a cathode active material, a cathode conductor and a cathode binder, and the anode composite comprises an anode active material, an anode conductor and an anode binder, and an elongation percentage of the anode binder is greater than an elongation percentage of the cathode binder.

The anode current collector may have a thickness greater than a thickness of the cathode current collector before the pressing of the stacked cathode layer and anode layer such that upon the pressing, the area of the cathode layer and an area of the anode layer may be different due to a difference between the thickness of the anode current collector and the thickness of the cathode current collector. For example, the anode current collector may have the thickness that is 1%, 2%, 5%, 10%, 15%, 20%, 25%, 30%, 40%, or 50% greater than the thickness of the cathode current collector.

The thickness of the cathode composite layer and the thickness of the anode composite layer may be same or about the same, and the elongation percentage of the anode binder may be greater than the elongation percentage of the cathode binder.

The all-solid battery may further include an auxiliary elongation member which is adhered to a first surface of the anode layer opposite to a second surface that is in contact with the electrolyte layer so the extent of elongation of the anode layer is increased, and in certain embodiments, the auxiliary elongation member may have an elongation percentage of at least about 110%, at least about 120%, at least about 130%, at least about 140%, or at least about 130% of an elongation percentage of the anode layer.

In other preferred aspect, provided is a method of manufacturing an all-solid battery. The method may include forming a cathode layer and an anode layer wherein an area of the cathode layer and an area of the anode are same area; stacking the cathode layer and the anode layer; disposing an electrolyte layer between the cathode layer and the anode layer; and pressing the cathode layer, the electrolyte layer and the anode layer, wherein, upon the pressing, the area of the cathode layer may be different from the area of the anode layer.

The area of the anode layer may be greater than the area of the cathode layer upon the pressing. For example, the area of the anode layer may be about 1% or greater, about 2% or greater, about 5% or greater, about 10% or greater, about 15% or greater or about 20% or greater than the area of the cathode layer.

The cathode layer may include a cathode current collector coated with a cathode composite layer, the anode layer may include an anode current collector coated with an anode composite layer, and an elongation percentage of the cathode current collector and an elongation percentage of the anode current collector are different.

An elongation percentage of the anode current collector may be of about 101% to 120% of an elongation percentage of the cathode current collector. For example, the elongation percentage of the anode current collector may be greater than about 100% but less than about 150%, greater than about 100% but less than about 140%, greater than about 100% but less than about 130%, greater than about 100% but less than about 130%, or about 101% to 120% (e.g., 101%, 102%, 103%, 104%, 105%, 106%, 107%, 108%, 109%, 110%, 111%, 112%, 113%, 114%, 115%, or 120%) of the elongation percentage of the cathode current collector.

The cathode composite may include a cathode active material, a cathode conductor and a cathode binder, and the anode composite may include an anode active material, an anode conductor and an anode binder, and an elongation percentage of the anode current collector may be greater than an elongation percentage of the cathode current collector, and an elongation percentage of the anode binder may be greater (e.g. at least by about 1%, 2%, 3%, 4%, 5%, 6%, 7%, 8%, 9%, 10%, 15%, or 20%) than an elongation percentage of the cathode binder.

A thickness of the anode current collector may be greater than a thickness of the cathode current collector before the pressing such that, upon the pressing, the area of the cathode layer and an area of the anode layer are different due to difference between the thickness of the anode current collector and the thickness of the cathode current collector. A thickness of the cathode composite layer and a thickness of the anode composite layer may be same, and an elongation percentage of the anode binder may be greater than an elongation percentage of the cathode binder.

The method may further include adhering an auxiliary elongation member having an elongation percentage of at least about 110%, about 120%, about 130%, about 140%, or about 150% of an elongation percentage of the anode layer to a first surface of the anode layer opposite to a second surface that is in contact with the electrolyte layer in order to increase the extent of elongation of the anode layer.

According to the present invention, an all-solid battery may have a difference (e.g., at least by about 1%, about 2%, about 5%, about 10%, or about 15%) in area between an anode layer and a cathode layer which may be generated during a cell pressing process. As consequence, cell breakage due the intensive application of stress at a battery edge portion may be reduced, thereby decreasing the likelihood of a battery short-circuit fault. Likewise, because the likelihood of a short-circuit fault at the battery edge portion may be decreased through simple stacking and pressing even without an additional insulation member, the manufacturing process may be simplified and manufacturing costs may be reduced, thus ensuring mass productivity.

Other aspects of the invention are disclosed infra.

DETAILED DESCRIPTION

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprise", "include", "have", etc. when used in this specification, specify the presence of stated features, regions, integers, steps, operations, elements and/or components but do not preclude the presence or addition of one or more other features, regions, integers, steps, operations, elements, components, and/or combinations thereof.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, a detailed description will be given of preferred embodiments of the present invention with reference to the appended drawings.

Figure 1:
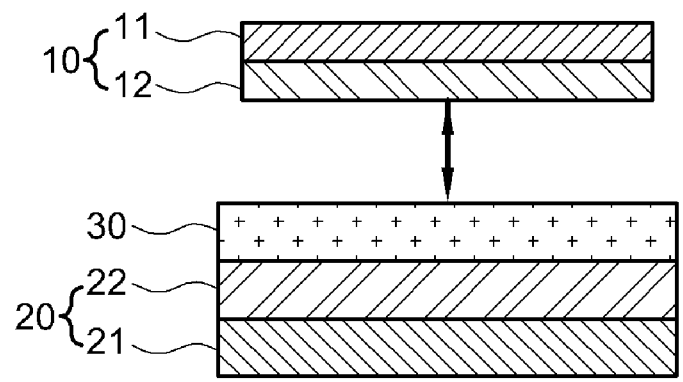
FIG. 1 shows a cell having an area of an anode greater than an area of a cathode in the related art.
Figure 2:
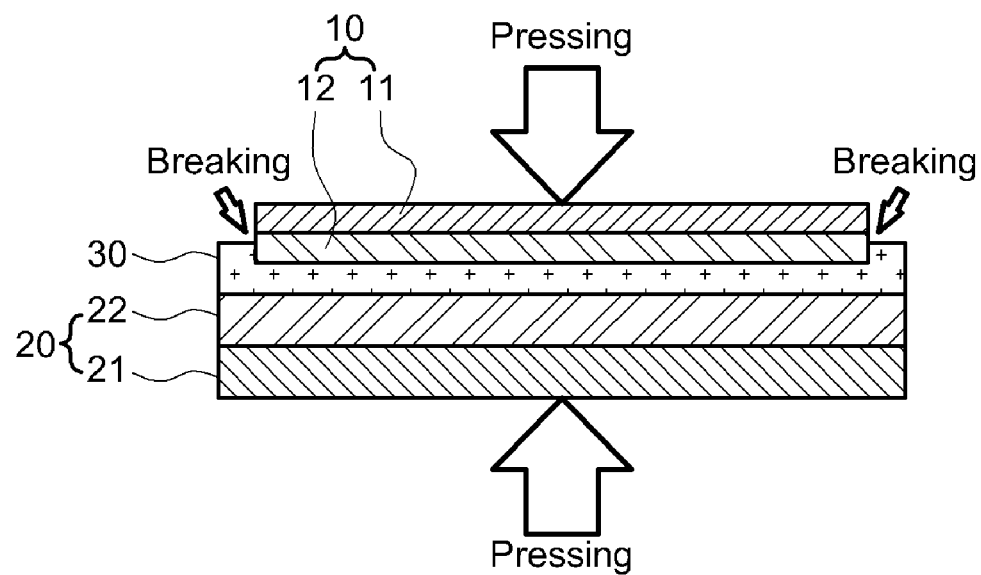
FIG. 2 shows a breakage of the edge portion upon pressing the cell of FIG. 1 in the related art.
Figure 3:
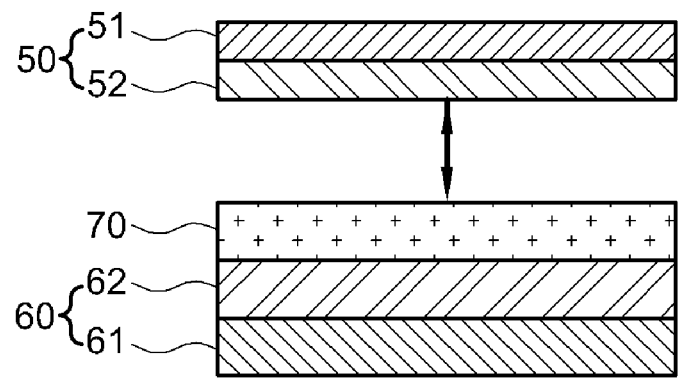
FIG. 3 shows cell stacking in an exemplary all-solid battery before pressing according to an exemplary embodiment of the present invention.
Figure 4:
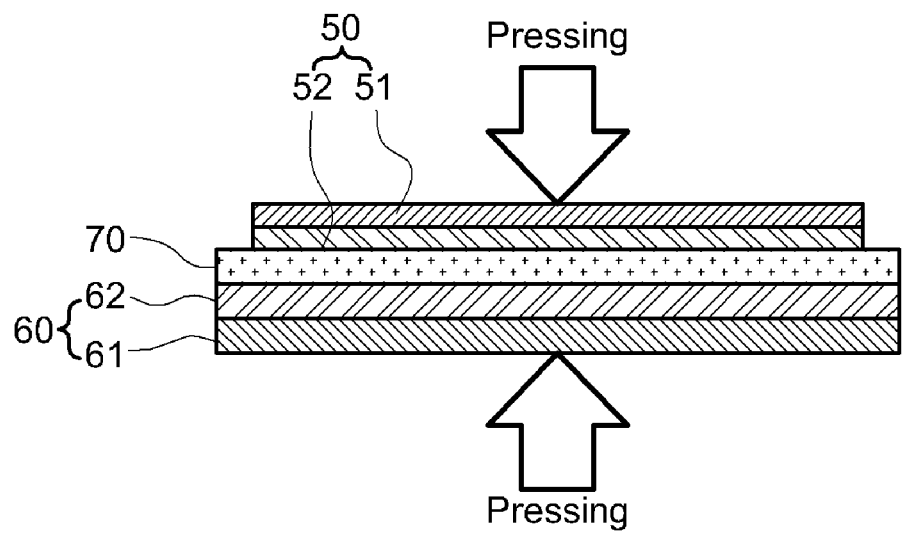
FIG. 4 shows an exemplary all-solid battery after pressing according to an exemplary embodiment of the present invention.

FIGS. 3 and 4 schematically show the cross-section of an exemplary cell before and after pressing, FIG. 3 illustrating the state before pressing and FIG. 4 illustrating the state after pressing.

Particularly, in a preferred embodiment of the present invention, a cathode and an anode may be formed so as to have substantially the same area as each other, and the cathode and the anode may be manufactured using respective materials having different elongation percentages. The areas of the cathode and the anode may become different from each other depending on individual elongation percentages thereof after a pressing process. In an embodiment of the present invention, an all-solid battery may be manufactured using current collectors having the same size. An elongation percentage of a cathode current collector layer 51 and an elongation percentage of an anode current collector layer 61 may be different from each other. The extents of elongation of the cathode and the anode may be different due to the ductility of the current collectors during pressing.

In addition, the present invention provides a method of manufacturing an all-solid battery. The method may include steps of: forming a cathode layer 50 and an anode layer 60 wherein an area of the cathode layer and an area of the anode are same area; stacking the cathode layer 50 and the anode layer 60; disposing an electrolyte layer 70 between the cathode layer 50 and the anode layer 60; and pressing the cathode layer 50, the electrolyte layer 70 and the anode layer 60. Upon the pressing the stacked layers, the cathode layer 50 and the anode layer 60 may have different areas from each other due to the difference in extent of elongation between the cathode layer 50 and the anode layer 60.

During the pressing, the cathode and the anode may be elongated due to the ductility of the current collectors. As such, the elongation percentages or the elongation areas may be different. Preferably, the anode may have an elongation area greater than that of the cathode and as a result, a short-circuit fault may be prevented fin the battery edge portion upon pressing.

FIGS. 3 and 4 show the cell-stacking structure difference before (FIG. 3) and after the pressing (FIG. 4), and the areas of the cathode and the anode may be changed to be different from each other before and after pressing. For instance, the anode layer 60 and the cathode layer 50 may have the same area before the pressing process.

Further, according to an exemplary embodiment of the present invention, a battery may be manufactured to include current collectors. For instance, respective current collectors, e.g., cathode current collector and anode current collector, having the same area may be coated with an anode composite slurry and a cathode composite slurry to form an anode layer 60 and a cathode layer 50 which may have the same area as each other. In addition, a solid electrolyte layer 70 having the same area may be interposed therebetween. The anode composite slurry may suitably include an anode active material typically used in a secondary battery, for example, silicon (Si), tin (Sn), or graphite. Also, the cathode composite slurry may contain a cathode active material typically used in a second battery, for example, NCM (Lithium nickel cobalt manganese oxide), LCO (Lithium cobalt oxide), NCA (Lithium nickel cobalt aluminum oxide), or LFP (Lithium iron phosphate).

The anode composite 62 may include an anode conductor and an anode binder, which may be mixed with an anode active material, and the cathode composite may include a cathode conductor and a cathode binder, which may be mixed with a cathode active material. For instance, each of the anode composite 62 and the cathode composite may be applied in the form of slurry. The coating process may include any process typically used for electrode coating, such as bar coating, gravure coating, but the exemplary method is not limited thereto.

The electrolyte layer 70 may be interposed between the cathode layer 50 and the anode layer 60. The electrolyte layer 70 may be formed by inserting an all-solid electrolyte composed of a sulfide- or oxide-based material using a lamination process or a coating process. Preferably, the electrolyte layer 70 may also be formed so as to have the same area as the cathode layer 50 and the anode layer 60.

As shown in FIG. 3, the cathode layer 50, the anode layer 60 and the electrolyte layer 70, having the same area may be prepared to, after stacking, fabricate a battery having a predetermined area without any protrusions.

After the preparation of the stacked battery, a pressing process may be performed. FIG. 4 shows the cross-section of the battery upon the pressing process. For instance, the area of the anode layer 60 may be greater than the area of the cathode layer 50 after the pressing process.

Likewise, as shown in FIG. 3, the cathode layer 50, the anode layer 60, and the solid electrolyte layer 70 may be formed so as to have the same area, after which the pressing process may be performed under the condition that the cathode layer 50 and the anode layer 60 may have different extents of elongation. Particularly, in pressed battery, the area of the cathode layer 50 may be different from the area of the anode layer 60, as shown in FIG. 4. In order to ensure desired battery performance, the area of the anode layer 60 may be greater than the area of the cathode layer 50, as described above, and thus, the area of the anode layer 60 may be formed to be greater than the area of the cathode layer 50. Alternatively, the area of only the cathode layer 50 may be increased.

The cathode layer 50 and the anode layer 60 may have different extents of elongation, so the elongation percentages of materials therefore may be different. For example, in a preferred embodiment of the present invention, an elongation percentage of the cathode current collector and an elongation percentage of the anode current collector may be different. Particularly, a material for an anode current collector layer 61 may be selected such that the elongation percentage thereof may be greater than that of a cathode current collector layer 51, when the anode layer 60 and the cathode layer 50 are formed. The extent of elongation of the anode current collector layer 61 may be increased during the pressing process, and thus the anode layer 60 may have greater area than cathode layer 50. Respective current collector layers may be coated with a cathode composite layer 52 and an anode composite layer 62. Hence, a difference in extent of elongation between the anode layer 60 and the cathode layer 50 may be generated by adjusting the elongation percentages of the current collector layers.

Table 1 below shows elongation percentages of main metals used for the current collectors.

TABLE 1

| | Yield Strength MPa (ksi) | Tensile Strength MPa (ksi) | Ductility (% EL) [in 50 mm (20 in.)] |
|---|---|---|---|
| Aluminum | 35(5) | 90(13) | 40 |
| Copper | 69(10) | 200(29) | 45 |
| Brass(70Cu—30Zn) | 75(11) | 300(44) | 68 |
| Iron | 130(19) | 262(38) | 45 |
| Nickel | 138(20) | 480(70) | 40 |
| Steel(1020) | 180(26) | 380(55) | 25 |
| Titanium | 450(65) | 520(75) | 25 |
| Molybdenum | 565(82) | 655(95) | 35 |

To improve battery efficiency, the area ratio of the cathode layer 50 and the anode layer 60 preferably may range from about 1:1 to about 1:1.1, and thus, the elongation percentage of the anode current collector layer 61 may preferably be about 101% to 120% of the elongation percentage of the cathode current collector layer 51.

When the elongation percentage ratio of the anode layer relative to the cathode layer is less than 101%, the difference in area between the anode layer and the cathode layer may decrease, and lithium may precipitate at the anode edge portion upon charging and discharging. The elongation percentage ratio may be limited not to exceed 120% to maintain energy density.

In addition to the different elongation percentages of respective current collectors for the cathode layer 50 and the anode layer 60, the cathode composite layer 52 and the anode composite layer 62 may have different elongation percentages.

A cathode composite may include a cathode active material, a cathode conductor and a cathode binder. The components for cathode composite (e.g., cathode active material, cathode conductor and cathode binder) may be mixed together, and an anode composite may include an anode active material, an anode conductor and an anode binder, which are mixed together.

Accordingly, the elongation percentage of the anode composite layer 62 may be formed to be greater than that of the cathode composite layer 52. This elongation percentage difference may be obtained by adjusting the elongation percentages of the binders. The electrodes formed by applying respective active materials in a powder phase may be connected to each other by means of the binders, and the powder electrodes and the current collectors may also be connected using the binders. Thus, when only the current collectors are elongated or the powder electrodes are elongated to be greater than the current collectors, electrode delamination may occur during the pressing process, which is part of the battery fabrication process, or the powder electrodes may be formed to be greater than the current collectors. Hence, these problems may be solved by adjusting the elongation percentages of the binders.

Table 2 below shows the elongation percentages for respective binders.

TABLE 2

| Polymer Type | Ultimate Tensile Strength (MPa) | Elongation at break (%) | Tensile Modulus (GPa) |
|---|---|---|---|
| ABS | 40 | 30 | 2.3 |
| ABS + 30% Glass Fiber | 60 | 2 | 9 |
| Acetal Copolymer | 60 | 45 | 2.7 |
| Acetal Copolymer + 30% Glass Fiber | 110 | 3 | 9.5 |
| Acrylic | 70 | 5 | 3.2 |
| Nylon 6 | 70 | 90 | 1.8 |
| Polyamide-Imide | 110 | 6 | 4.5 |
| Polycarbonate | 70 | 100 | 2.6 |
| Polyethylene, HDPE | 15 | 500 | 0.8 |
| Polyethylene, Terephthalate(PET) | 55 | 125 | 2.7 |
| Polyimide | 85 | 7 | 2.5 |
| Polyimide + Glass Fiber | 150 | 2 | 12 |
| Polypropylene | 40 | 100 | 1.9 |
| Polystyrene | 40 | 7 | 3 |

Likewise, the electrolyte layer 70 between the cathode layer 50 and the anode layer 60 may be adjusted in the extent of elongation thereof such that it is elongated so as to be suitable for an electrode layer having a large area after the pressing. For instance, as illustrated in FIG. 4, the area of the electrolyte layer 70 may be equal to the area of the anode layer 60.

In an exemplary embodiment of the present invention, the thicknesses of the layers (e.g., cathode layer and anode layer) to be stacked are set differently so as to obtain different extents of elongation.

Figure 5:
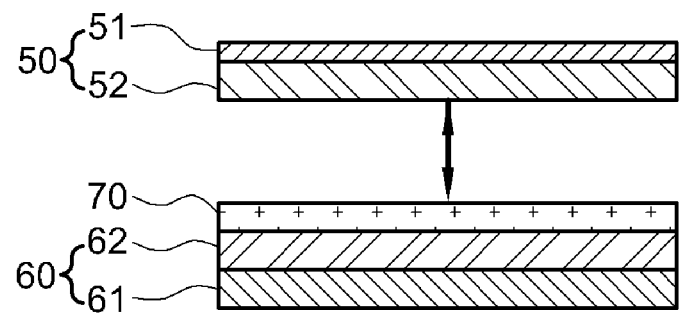
FIG. 5 shows exemplary cell stacking in an exemplary all-solid battery before pressing according to an exemplary embodiment of the present invention.
Figure 6:
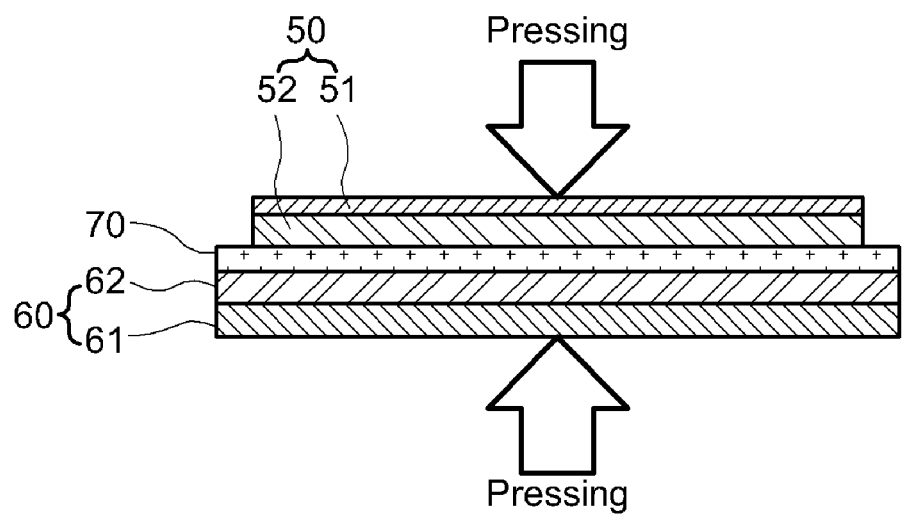
FIG. 6 shows an exemplary all-solid battery after pressing according to an exemplary embodiment of the present invention.

FIG. 5 shows the cell stacking in an all-solid battery according to an exemplary embodiment of the present invention before pressing, and FIG. 6 shows the all-solid battery according to an exemplary embodiment of the present invention after pressing.

As shown in FIG. 5, the battery may be manufactured in a manner in which the cathode layer 50, the anode layer 60, and the solid electrolyte layer 70 may be formed to have substantially the same area and are stacked, like FIG. 3, but some of the layers may have different thicknesses, unlike the embodiment shown in FIG. 3. As shown in FIG. 5, an anode current collector layer 61 may be preferably formed to be thicker than a cathode current collector layer 51. Here, materials, the elongation percentages of which are the same or almost the same, are applied.

When the pressing process is performed, as shown in FIG. 6, the elongation areas may become different due to a thickness difference between the anode current collector layer 61 and the cathode current collector layer 51, thus obtaining a battery having the same stacking structure as the stacking structure of FIG. 4.

Meanwhile, since it is difficult to adjust the extents of elongation of the anode composite layer 62 and the cathode composite layer 52 depending on the thicknesses thereof, as illustrated in FIG. 5, the cathode composite layer 52 and the anode composite layer 62 may be formed to have the same thickness, but the extents of elongation thereof may be controlled by adjusting the extents of elongation of the binders. The binder of the anode composite may have an elongation percentage greater than that of the binder of the cathode composite.

Figure 7:
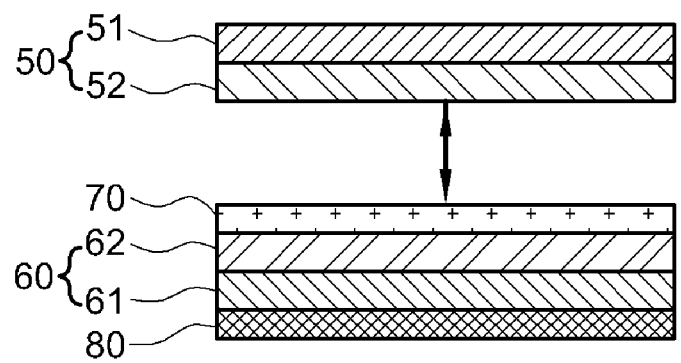
FIG. 7 shows an exemplary cell stacking in an exemplary all-solid battery before pressing according to an exemplary embodiment of the present invention.
Figure 8:
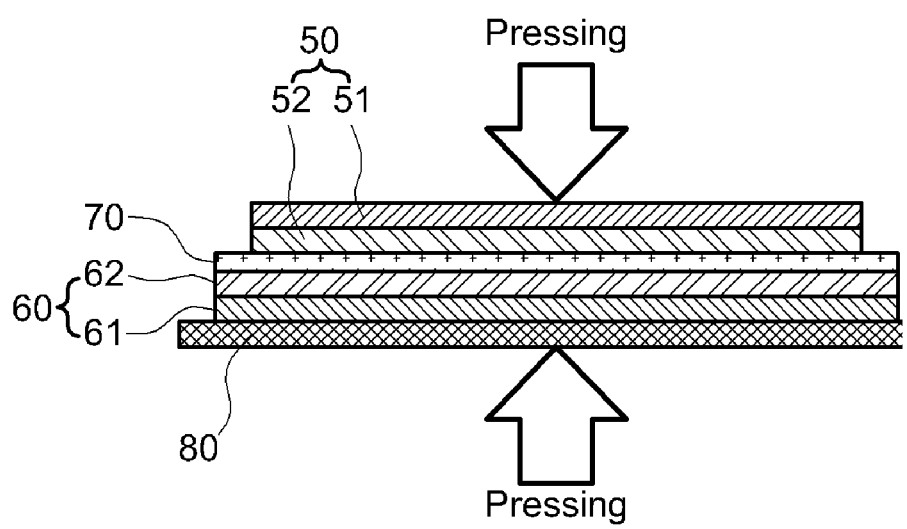
FIG. 8 shows an exemplary all-solid battery after pressing according to an exemplary embodiment of the present invention.

FIG. 7 shows the cell stacking in an all-solid battery according to an exemplary embodiment of the present invention before pressing, and FIG. 8 shows the all-solid battery according to an exemplary embodiment of the present invention after pressing.

In addition, the thickness difference in the current collectors, as shown in FIG. 5, may not be provided but an auxiliary elongation member 80 may be provided on the outer surface of an electrode layer to be greatly elongated, thus inducing to elongate the corresponding electrode layer. Such an auxiliary elongation member 80 may include a material having an elongation percentage greater than the elongation percentage of the electrode current collector that is in contact therewith.

In particular, as shown in FIG. 8, the auxiliary elongation member 80 may be adhered to a first surface of the anode layer 60 opposite to a second surface that is in contact with the electrolyte layer 70 in order to increase the extent of elongation of the anode layer 60. The auxiliary elongation member 80 may be essentially attached with sufficiently strong adhesion to the anode current collector layer 61, and the extent of elongation of the anode current collector layer 61 may also be increased by virtue of the large extent of elongation of the auxiliary elongation member 80. The elongation percentage of the auxiliary elongation member 80 may be preferably about 130% or greater of the elongation percentage of the anode layer 60.

The materials for the binders may be set differently, as discussed above, in order to increase the extent of elongation of the anode composite layer 62.

Adhering the auxiliary elongation member 80 may be additionally carried out during the stacking of the cathode layer 50, the anode layer 60 and the electrolyte layer 70.

Although the various exemplary embodiments of the present invention have been disclosed for illustrative purposes, those skilled in the art will appreciate that various modifications, additions and substitutions are possible, without departing from the scope and spirit of the invention as disclosed in the accompanying claims. Also, many changes may be made to specific situations or materials within a range that does not depart from the essential scope of the present invention. Therefore, the present invention is not to be limited to the details of the preferred embodiments thereof, but will include all embodiments within the scope of the appended claims.

What is claimed is:

1. A method of manufacturing an all-solid battery, comprising:
forming a cathode layer and an anode layer wherein an area of the cathode layer and an area of the anode are same area;
stacking the cathode layer and the anode layer;
disposing an electrolyte layer between the cathode layer and the anode layer;
pressing the cathode layer, the electrolyte layer and the anode layer, wherein, upon the pressing, the area of the cathode layer is different from the area of the anode layer; and
adhering an auxiliary elongation member having an elongation percentage of at least about 130% of an elongation percentage of the anode layer to a first surface of the anode layer opposite to a second surface that is in contact with the electrolyte layer in order to increase the extent of elongation of the anode layer.

2. The method of claim 1, wherein the area of the anode layer is greater than the area of the cathode layer upon the pressing.

3. The method of claim 1, wherein the cathode layer comprises a cathode current collector coated with a cathode composite layer,
the anode layer comprises an anode current collector coated with an anode composite layer, and an elongation percentage of the cathode current collector and an elongation percentage of the anode current collector are different.

4. The method of claim 3, wherein an elongation percentage of the anode current collector is of about 101% to 120% of an elongation percentage of the cathode current collector.

5. The method of claim 3, wherein the cathode composite comprises a cathode active material, a cathode conductor and a cathode binder, and the anode composite comprises an anode active material, an anode conductor and an anode binder, and
an elongation percentage of the anode current collector is greater than an elongation percentage of the cathode current collector, and an elongation percentage of the anode binder is greater than an elongation percentage of the cathode binder.

6. The method of claim 5, wherein a thickness of the cathode composite layer and a thickness of the anode composite layer are same, and an elongation percentage of the anode binder is greater than an elongation percentage of the cathode binder.

* * * * *